United States Patent [19]
Land et al.

[11] 3,833,427
[45] Sept. 3, 1974

[54] PLANAR BATTERY, PROCESS OF MANUFACTURE THEREOF AND FILM CASSETTE INCLUDING THE SAME

[75] Inventors: Edwin H. Land, Cambridge; Robert M. Delahunt, Norwell, both of Mass.

[73] Assignee: Polaroid Corporation, Cambridge, Mass.

[22] Filed: July 27, 1973

[21] Appl. No.: 383,173

[52] U.S. Cl. .............. 136/111, 136/175, 136/166, 354/202
[51] Int. Cl. ..................................... H01m 21/04
[58] Field of Search ............ 136/111, 87, 108, 132, 136/133, 147, 163, 169, 175, 166; 354/202; 206/455

[56] References Cited
UNITED STATES PATENTS

| | | | |
|---|---|---|---|
| 2,666,802 | 1/1954 | Woodring et al. | 136/111 |
| 2,889,389 | 6/1959 | Tamminen | 136/111 |
| 2,928,890 | 3/1960 | Van Der Grinten et al. | 136/83 R |
| 3,440,105 | 4/1969 | Yamamoto et al. | 136/108 |
| 3,543,662 | 12/1970 | Erlichman | 354/202 |
| 3,563,805 | 2/1971 | Deierhoi, Jr. | 136/111 |
| 3,607,430 | 9/1971 | Glover | 136/111 |
| 3,617,387 | 11/1971 | Grulke et al. | 136/111 |
| 3,734,780 | 5/1973 | Bilhorn et al. | 136/111 |

*Primary Examiner*—Anthony Skapars
*Attorney, Agent, or Firm*—Robert M. Ford

[57] ABSTRACT

A relatively thin, flat or planar battery which includes one or more cells in series relationship which comprise a planar anode in superposed relationship with a planar cathode and a separator disposed intermediate and extending substantially coextensive the facing surfaces of the anode and cathode and possessing marginal portions and an aqueous electrolyte permeable central portion. Each cell includes an aqueous electrolyte disposed in the central portion of the separator and in contact with the facing surfaces of both the anode and the cathode and each battery possesses an electrically nonconducting, vapor-impervious hydrophobic sealant extending coextensive the marginal surfaces of the battery and intermediate the marginal portions of the separator and next adjacent facing surfaces. The energy generating components of the battery are disposed in and secured by the sealant to a container retaining both the energy-providing components of the battery cell or cells and the sealant selected.

38 Claims, 10 Drawing Figures

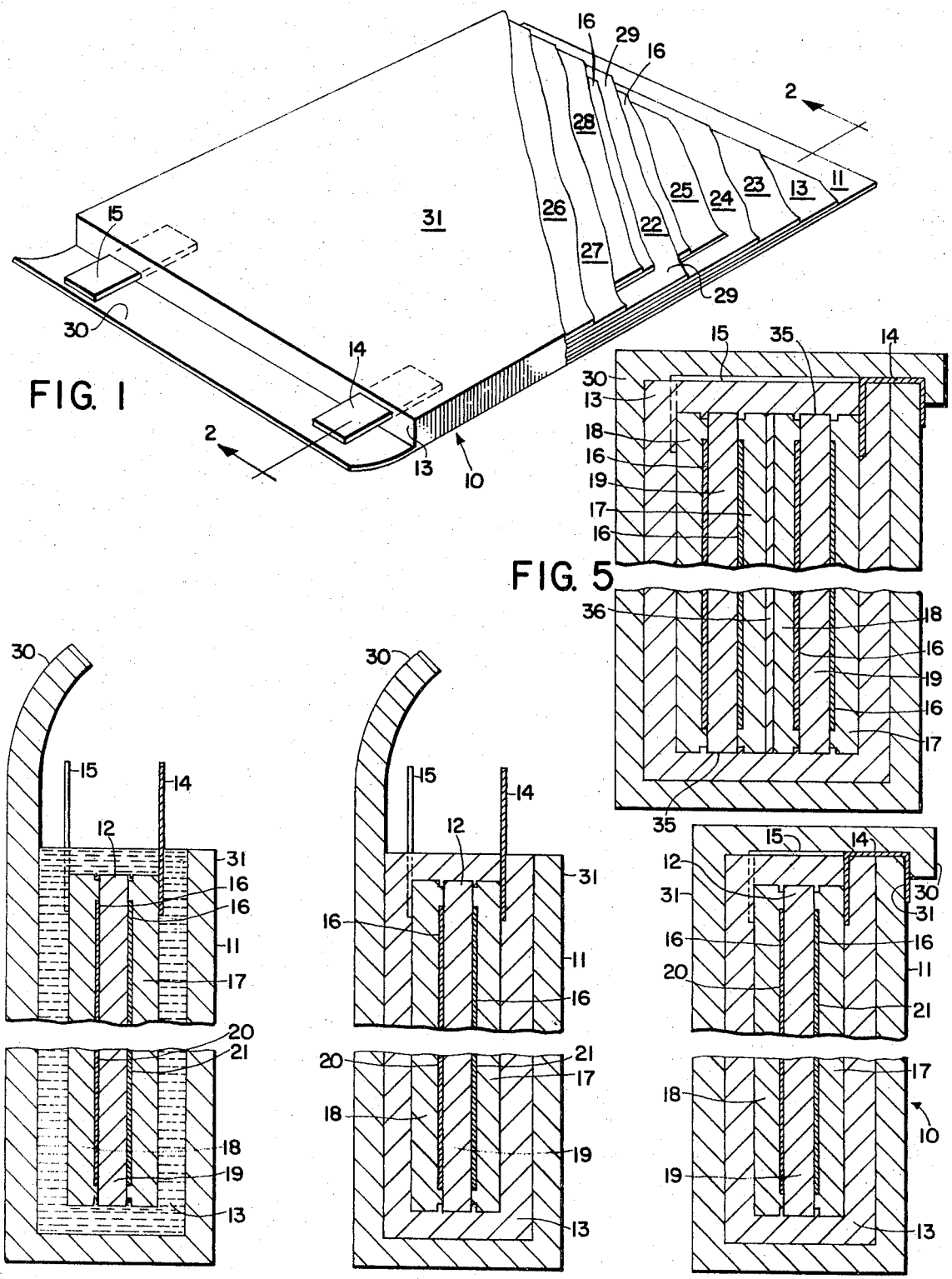

PATENTED SEP 3 1974 3,833,427

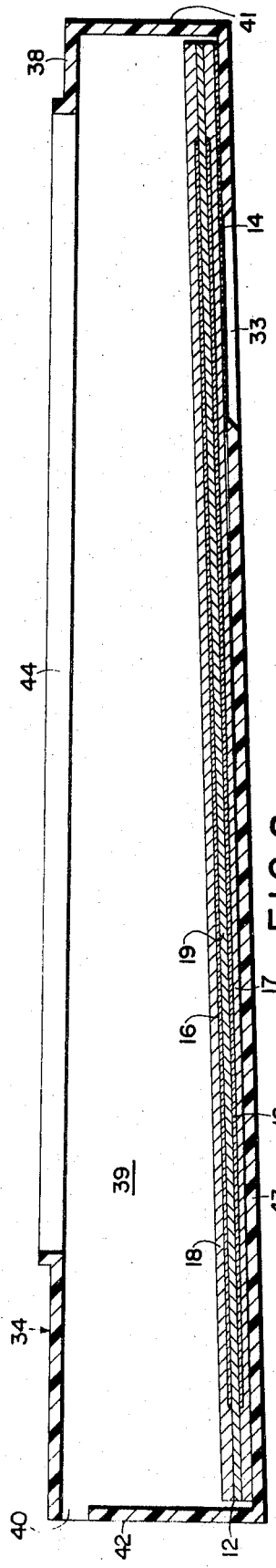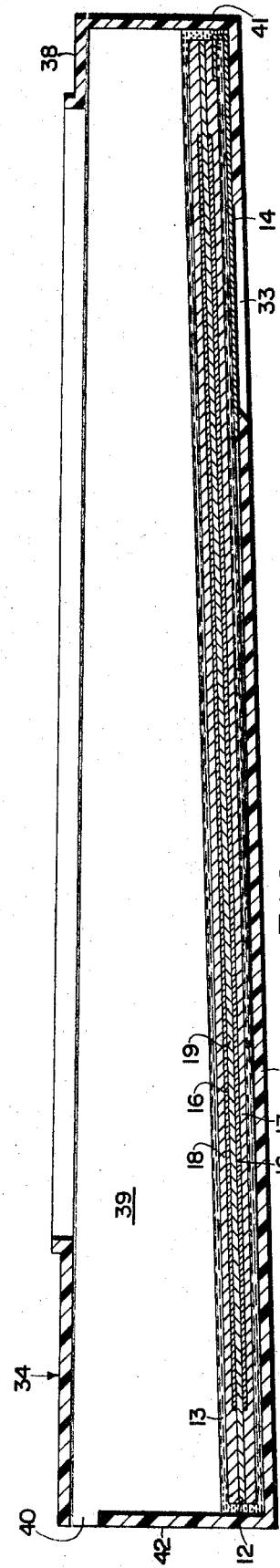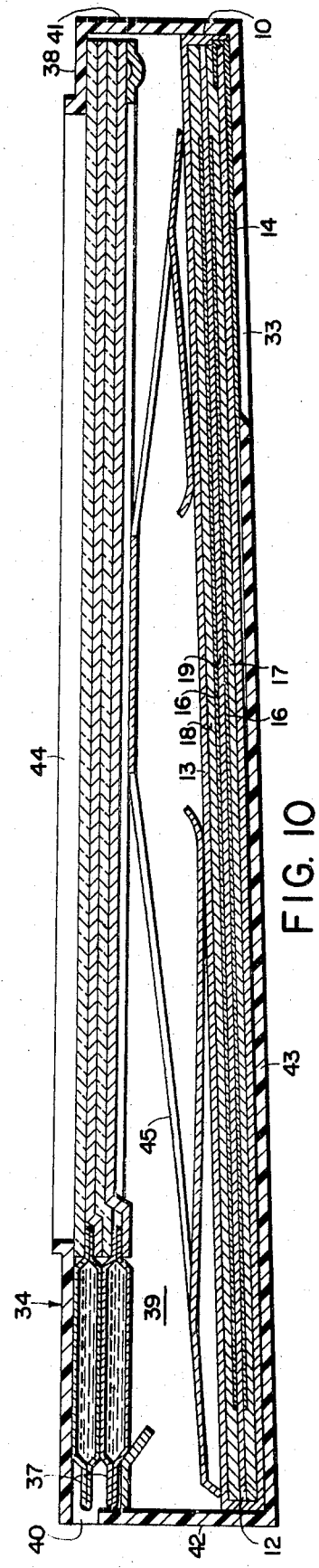

PLANAR BATTERY, PROCESS OF MANUFACTURE THEREOF AND FILM CASSETTE INCLUDING THE SAME

BACKGROUND OF THE INVENTION

The present invention is concerned with new and improved flat or planar batteries of the general type disclosed in U.S. Pat. Nos. 3,563,805; 3,617,387; 3,734,780; and the like.

As disclosed in the cited patents, in general such planar energy cells or batteries comprise superposed planar anode/cathode combinations possessing a separator disposed intermediate each anode and cathode and electrolyte disposed on or impregnated in the separator and in contact with respective facing surfaces of the anode and cathode.

Planar batteries of the type disclosed in the aforementioned U.S. patents are generally intended to be employed as a individual power source for portable electrically operated devices wherein the selected device design parameters are optimized by the availability and employment of a planar battery exhibiting reliability with respect to its power delivery characteristics. Batteries of the type in question presently are employed commercially to operate the various electrically powered systems of the photographic camera sold by Polaroid Corporation, Cambridge, Massachusetts, U.S.A., under the trademark "SX-70." In such cameras, the battery, disposed as a component of a film pack for employment and in combination with the camera, provides the electrical energy necessary to operate the camera's exposure control, film transport and photoflash systems and, accordingly, such battery is required to operate in a sequential series of power generating modes which may or may not be interrupted by more or less extended recovery and/or storage times and under which conditions to deliver the required series of high current pulses dictated by the photographic system design.

As disclosed in aforementioned U.S. Pat. No. 3,563,805, etc., maintenance of the integrity and electrical power generating capability of the energy cell is to be accomplished by adhesively securing the various components of the cell and bounding the selected electrolyte and separator by a peripheral frame of moisture-impervious adhesive material marginally adhered to the anode and the cathode.

SUMMARY OF THE INVENTION

The present invention is directed to a new and improved energy cell or battery which comprises one or more individual cells each of which include a planar anode superposed substantially coextensive a planar cathode and possessing a planar separator including an electrolyte permeable central portion surrounded by substantially electrolyte-free marginal portions positioned between the anode and cathode. Aqueous electrolyte is disposed in the central portion of the separator and in contact with opposed facing surfaces of both the anode and cathode and the battery additionally includes an electrically nonconducting, vapor-impervious hydrophobic and thermoplastic sealant, preferably a thermoplastic wax, extending coextensive the marginal surfaces of the battery and intermediate the marginal portions of the separator and next adjacent facing surfaces within a container and retaining and securing the energy producing components of the cell in operative relationship within and secured to the selected container.

BRIEF DESCRIPTION OF THE DRAWINGS

FIG. 1 is a fragmentary perspective view of one embodiment of a battery unit in accordance with the present invention;

FIGS. 2, 3 and 4 are diagrammatic enlarged cross-sectional views of the battery of FIG. 1, along section line 2—2, illustrating the association of elements during the three illustrated stages of a process for the production of the battery of FIG. 1 according to the present invention, the thickness of the various materials being exaggerated for the purpose of illustration, and wherein FIGS. 2 and 3 represent processing stages and FIG. 4 represents a product of the process;

FIG. 5 is a diagrammatic enlarged cross-sectional view of a battery similar to FIG. 1, along an analogous section line 2—2, illustrating the association of elements constituting a multicell battery assemblage constructed in accordance with the present invention and the process of FIGS. 2 and 3;

FIGS. 8, 9 and 10 are diagrammatic cross-sectional views of the container of FIG. 5, along section line 6—6, illustrating the association of elements during the three illustrated stages of a process for the production of a battery according to the present invention and wherein FIGS. 8 and 9 represent processing stages and FIG. 10 represents a product of the process.

DETAILED DESCRIPTION OF THE INVENTION

Figure 6:
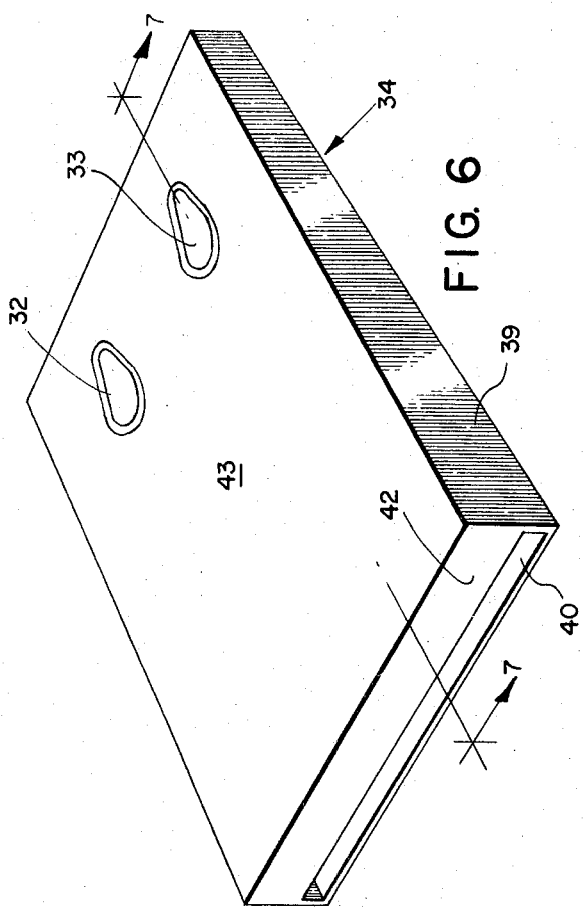
FIG. 6 is a perspective view of a parallelepiped container adapted to enclose and retain photographic film units and a battery constructed in accordance with the present invention.

In accordance with the present invention, the preferred form of the battery assemblage of the present invention comprises one or more planar electrical energy cells disposed in a container, each cell in series relationship and including superposed planar anode and cathode elements having disposed between their facing surfaces a separator possessing an electrolyte permeable central portion or section surrounded by substantially electrolyte-free marginal portions. Aqueous electrolyte is disposed in the central section and in contact with the facing surfaces of both the anode and cathode, and an electrically nonconducting thermoplastic wax sealant is disposed in the container sealing the marginal surfaces of the battery and providing an aqueous electrolyte impermeable seal between the marginal portions of the separator and the next adjacent facing anode and cathode surfaces to prevent escape of the aqueous electrolyte from its spacial location within the electrical energy generating components of the cell.

Referring to the drawings, there is shown in perspective in FIG. 1 and in cross-section in FIGS. 4, 5, 7 and 10 specified batteries or energy cells of the present invention wherein the battery of FIGS. 1, 4, 5 and 7 may be manufactured in accordance with the procedure illustrated in FIGS. 2 and 3 and the battery of FIG. 10 is manufactured in accordance with the procedure illustrated in FIGS. 8 and 9.

As shown in FIGS. 1 through 4, battery 10 may comprise envelope or container 11 retaining superposed electrical energy generating components 12 of battery 10 disposed within electrically nonconducting, vapor-impervious thermoplastic sealant 13 extending around and coextensive the external or exterior surfaces of generating components 12. Sealant 13 acts to encapsulate energy components 12 and alone and/or taken together with envelope 11 prevents escape of aqueous electrolyte 16 and/or electrolyte solvent or vapor from its predetermined spacial location within battery 10's structure.

Electrical leads 14 and 15, respectively, extend from the interior of the battery and, specifically, individually from cathode or positive electrode 17 and from anode or negative electrode 18 of battery 10 through encapsulating matrix 13 for electrical interconnection with the intended device to be powered by the cell.

As seen by reference to FIGS. 2 through 4, electrical energy generating components 12 comprise, in essence, planar anode 18 in superposed relationship with planar cathode 17 having separator 19 disposed intermediate facing surfaces 20 and 21, respectively, of anode 18 and cathode 17, within the confines of container 11. Aqueous electrolyte 16 is disposed in the central portion 22 of separator 19 and in contact with each of facing surfaces 20 and 21.

In the preferred embodiment, the battery will ordinarily comprise a LeClanche electrochemical system including a zinc negative or anode system 18 and a manganese dioxide positive or cathode system 17. The aqueous electrolyte 16 will generally comprise an aqueous ammonium chloride and/or zinc chloride electrolyte which will be disposed between and in contact with the facing surface of each of the anode and the cathode and in contact and impregnated into electrolyte permeable central portion 22 of separator 19.

As shown in FIG. 1, the preferred anode 18 may itself advantageously comprise, in combination, a composite structure including metallic sheet current collector plate 23 preferably an aluminum, lead or steel sheet material on the order of less than ten mils in thickness; polymeric current collector 24 preferably a sheet of electrically conductive carbon impregnated vinyl film sold under the trade designation "Condulon" possessing the same relative external dimensions as the anode and in the order of about seven mils in thickness, and a distribution of active zinc negative material 25 either as a zinc paste carried on the conductive polymeric collector 24 or active sheet zinc secured to collector 24, in each instance amalgamated in the conventional manner as, for example, with mercury by contact with mercuric chloride.

The preferred cathode 17 may itself comprise a metallic sheet current collector plate 26 analogous in construction to collector 23; polymeric current collector 27 also analogous in construction to collector 24, and active positive material 28 as a cathodic paste deposition on collector 27, for example, the maganese dioxide/electrically conductive carbon mixture dispersed in a polymeric binder which is employed in the manner conventional in the battery art.

Electrolyte 16 will ordinarily comprise a conventional aqueous ammonium chloride/zinc chloride about 4:1 dispersed in a polymeric binder, for example, on the order of about five or more percent applied to and impregnated in central portion 22 of separator 19 and in contact with the facing surfaces of active positive material 28 and active negative material 25.

In general, marginal portions 29 of separator 19 will be maintained free of electrolyte 16 and may be coated on each surface with and impregnated by a thermal sealing adhesive such as a polymeric hot melt adhesive, for example, a conventional hot melt vinyl adhesive, adapted to secure the separator to the anode and cathode, respectively, for example, marginal sections 29 of separator 19 to the facing marginal sections of polymeric collectors 24 and 27.

As seen by reference to FIGS. 2 and 3, batteries of the type detailed in FIGS. 1, 4, 5 and 7 may be prepared, in accordance with one embodiment of the present invention, by assembling the aforementioned electrical energy generating components 12 of the battery in the configuration detailed above and disposing the assemblage of components within the confines of container 11. Thermoplastic sealant 13 is provided in fluid state to container 11 to effect encapsulation and sealing of the assemblage upon solidification of the sealant as specifically illustrated in FIG. 3. Flap 30 of container 11 together with electrical leads 14 and 15 may be biased to overly surface 31 of container 11 thus providing both positive and negative leads contiguous surface 31 to present the leads at terminal ports 32 and 33 of photographic film pack container 34 illustrated in FIG. 6.

As previously stated, the thermoplastic sealant is preferably a thermoplastic wax possessing a melting point within the range of about 140° F. to 200° F., which accordingly is solid at ambient temperatures, hydrophobic with respect to the aqueous electrolyte composition and electrically insulating.

Although the wax sealant 13 may be disposed in the container in solid state and melted in situ to provide the battery structure, it is preferred that it be provided the container in the fluid state and that the container and battery assemblage be at a temperature above the melting point of the wax at the time of its introduction. In general, solidification of the wax sealant may be readily accomplished by any mechanism reducing the temperature and/or solvent concentration of the structure to the ambient range within which the battery is scheduled to be maintained and to operate.

The wax component of this invention can be any wax which can be deposited upon a surface as a molten or solvent cut coating and thereafter changed into a solid phase by cooling and/or by evaporation of the solvent. These waxes can be of mineral, vegatable, animal or synthetic origin. Mixtures of various waxes can also be utilized. Exemplary of waxes having a mineral origin are the petroleum and hydrocarbon waxes such as paraffin, microcrystalline, slack, ozocerite and montan waxes. Waxes having a vegetable origin are carnauba, candelilla, Japan waxes, and the like. Waxes having an animal origin include bees, Chinese, insect and similar waxes. In the animal and vegetable waxes the main constituents are high molecular weight esters and saturated hydrocarbons and lesser amounts of alcohols and acids. Exemplary of the synthetic waxes include those produced by the esterification of polyhydric alcohols or by the hydrogenation of vegetable oils or those made by the Fischer-Tropsch synthesis or substituted waxes such as oxidized or chlorinated polyethylene wax.

The use of petroleum waxes represents a preferred embodiment of this invention. These waxes include paraffin waxes and the microcrystalline waxes each having a melting point from about 140° F. to about 200° F. These waxes may be fully refined and thus contain very small amounts of hydrocarbon oils or they may be semi-refined (slack waxes).

The most preferred compositions of this invention utilize one hundred percent by weight microcrystalline wax or a combination of petroleum waxes comprising from 20 to 80 percent by weight of a paraffin wax and from 80 to 20 percent of microcrystalline wax. Increasing the concentration of microcrystalline wax will impart a higher maximum use temperature and improve the ultimate physical strength while decreasing dimensional stability. With respect to paraffin waxes as a class the use of a non-normal paraffin wax imparts higher physical strength than the normal base paraffin waxes.

While various waxes possessing the properties denoted are readily available from a multiplicity of commercial sources, it has been found that, in general, microcrystalline waxes, for example, those sold by the Sun Oil Company under the trade designation "6751" and melting at 178° F. to 180° F. specifically perform in the preferred manner.

Container 11 may itself comprise any container material that will appropriately retain the wax sealing during production of the battery in accordance with the present invention as, for example, forty to 60 pound grease-proof glassine envelopes sold by Deerfield Paper Company under the trade designation "H-99" and Riegal Products Company under the trade designation "KA60AA" and the photographic film pack containers detailed hereinafter.

Separator 19 will be constructed of and comprise a conventional battery separator material such as aqueous electrolyte permeable fibrous sheet materials, for example, microporous paper, kraft papers and polymeric sheet materials such as woven polyester sheet, etc.

In a particularly preferred embodiment of the present invention, separator 19 will possess spacer elements (not shown) disposed at marginal sections 29 to space separator 19 from the opposed facing surface of either or both of cathode 17 and anode 18 to facilitate penetration of the wax sealant between marginal sections 29 of the separator and the next adjacent facing surfaces to facilitate retention of aqueous electrolyte 16 and its solvent within the confines of its predetermined central cell location. Such spacers may be readily provided by embossing the marginal sections at appropriate locations.

In addition, marginal sections 29 may, and ordinarily will, carry a conventional heat-seal adhesive adapted to secure the marginal portions to the corresponding facing surfaces of both the anode 18 and cathode 17 to further facilitate sealing of the energy cell and which adhesive will ordinarily be impregnated into marginal sections 29 to facilitate the prevention of electrolyte loss by, for example, capillary transit through the separator to a cell edge. The selected adhesive preferably is one which interacts with the wax to increase both the cohesive and adhesive capacity of the wax sealant.

As illustrated by FIG. 6, the battery itself may comprise a multicell structure preferably arranged and constructed with the cells of the battery in superposed or stacked configuration and in electrical series relationship; the number of such cells determined by the power output of each cell and the power requirements of the device to be energized by the battery.

As shown in FIG. 5, intermediate each cell 35 there is located intercell connector 36 which in a preferred embodiment will comprise polymeric sheet material of the type described above with reference to current collectors 24 and 27 and upon opposed surfaces there may be secured the respective anode and cathode compositions of the opposed cells.

As previously stated, planar batteries of the type described herein are specifically adapted to commercial employment to operate the various electrically powered photographic systems of the photographic camera sold by Polaroid Corporation under the trademark "SX-70."

As disclosed in U.S. Pat. No. 3,543,662, a film pack or cassette for photographic cameras may be configured to retain a number of film units for selective sequential exposure and a flat or planar battery assembly for powering various photographic camera instrumentalities for employment of the film units.

As seen by reference to FIG. 6, the cassette may comprise a generally paralellepiped container or box 34 for holding and enclosing a plurality of film units 37 and a planar battery assemblage 10. Container 34 is shown as comprising a forward wall 38, side walls 39, a trailing end wall 41, a leading end wall 42, and a rear wall 43 and may be formed of a resilient plastic material. Forward wall 38 is provided with a generally rectangular exposure aperture 44 for transmitting light for exposing film units 37 carried within container 34. Leading end wall 42 is provided with a generally rectangular slot or exit orifice to provide a passage 40 at the leading end of the container through which film units 37 carried by the container are adapted to be individually withdrawn. Container 34 may additionally be provided with a dark slide or cover sheet (not shown) of any suitable opaque material such as paper or plastic sheet material positioned between the forwardmost film unit 37 and aperture 44 to serve as a light seal and which may be removed through withdrawal slot 40 once container 34 is located in its operative position within a camera apparatus.

Figure 7:
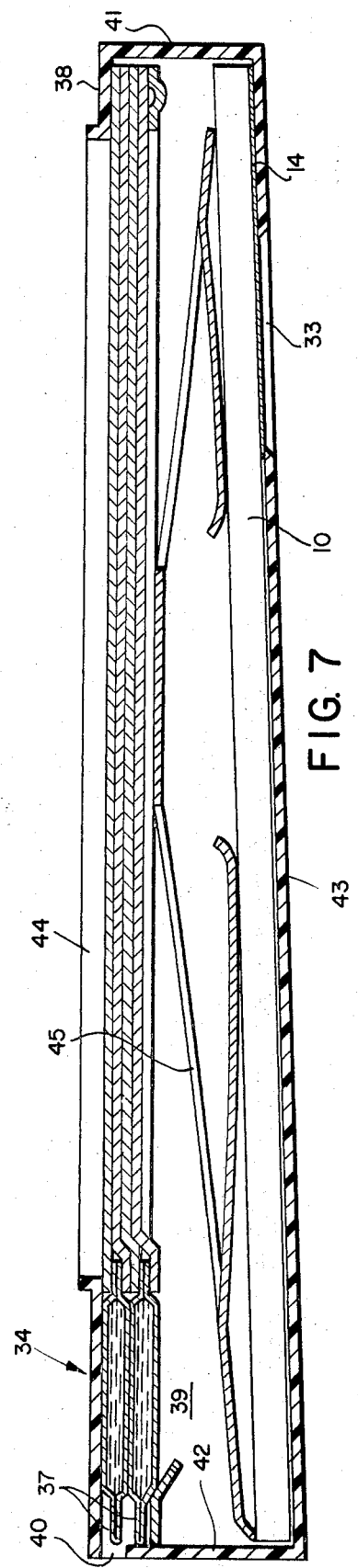
FIG. 7 is a diagrammatic cross-sectional view of the container of FIG. 5, along section line 6—6, illustrating disposition of photographic film units and the battery of FIG. 4.

The stack arrangement within container 34 of a plurality of film units 37 (two are shown) and a planar battery 10 is illustrated in FIG. 7. Each film unit 37 is arranged in overlying relationship with its exposure surface facing in the direction of exposure aperture 44.

As disclosed in aforementioned U.S. Pat. No. 3,543,662, the cassette additionally includes a spring-located platform 45 positioned between planar battery 10 and next adjacent film unit 37 for compressively retaining terminals 14 and 15 next adjacent cassette terminal ports 32 and 33 for interengagement with camera electrical leads, and for biasing film units 37 in the direction of exposure aperture 44.

Film units 10 may be advantageously constructed in accordance with the disclosure of any U.S. Pat. Nos. 3,594,165; 3,689,262; 3,672,890; or the like.

In a particularly preferred embodiment of the present invention illustrated in FIGS. 8 through 10, film cassette 34 simultaneously serves as the container of the battery assemblage and the battery is constructed by assemblying the electrical energy generating components 12 of the battery in the configuration detailed above and disposing the assemblage within the confines of container 34 next adjacent rear wall 43 with electrical leads 14 and 15, insulated where required, overlying cassette terminal ports 32 and 33. Thermoplastic sealant 13 is provided in fluid state to effect encapsulation and sealing of energy components 12 shown in FIG. 8 which upon solidification of sealant 12 provides the desired battery assemblage illustrated in FIG. 9.

The completed film cassette assemblage including film units 37, spring member 45 and energy components 12 shown in FIG. 10 is adapted for direct employment in camera devices of the type previously mentioned and disclosed in detail in U.S. Pat. Nos. 3,643,565; 3,714,879; and the like.

The capacity of each of the primary battery cells as described will vary substantially in proportion to the areas of their active surfaces. Typically, one such cell will produce about 0.10 to 0.15 amperes per square inch of surface area while yielding about 1.5 volts. For popular photographic camera sizes, an area within each film cassette available for retaining the batteries will provide about 10 to 12 square inches of practical surface. It follows, therefore, that the battery capacity desired for a film supplypower source combination readily may be varied through the simple expedient of combining a select number of discrete cells of predetermined dimension.

While it is preferred to employ the aforementioned LeClanche electrochemical system (comprising manganese dioxide positive active material, zinc negative active material, and an electrolyte comprising ammonium chloride and/or zinc chloride), the battery may employ a wide variety of positive and negative electrode materials and a wide variety of electrochemical systems including both primary and secondary systems. Among the positive electrode materials are such commonly used inorganic metal oxides as the previously described manganese dioxide, lead dioxide, nickel oxyhydroxide, mercuric oxide, and silver oxide, inorganic metal halides such as silver chloride and lead chloride, and organic materials capable of being reduced. Among the negative electrode materials are such commonly used metals as the previously described zinc, aluminum, magnesium, lead, cadmium, and iron. The invention may employ the electrolytes commonly used in the LeClanche system (ammonium chloride and/or zinc chloride), various alkaline electrolytes such as the hydroxides of potassium, sodium, and/or lithium, and acidic electrolytes such as sulfuric or phosphoric acids, the electrolytes, of course, being chosen to be compatible with the positive and negative electrodes.

Among the wide variety of electrochemical systems which may be used in the battery in addition to those in which the positive electrodes comprise manganese dioxide, the negative electrodes comprise metals such as zinc, aluminum, or magnesium, and the electrolyte substantially comprises an acidic solution of inorganic salts are the commonly known alkaline manganese systems in which the positive electrode comprises manganese dioxide, the negative electrodes comprise zinc, and the electrolyte substantially comprises a solution of potassium hydroxide. Other aqueous electrolyte systems, including those of nickel-zinc, silver-zinc, mercury-zinc, mercury-cadmium, and nickel-cadmium, may also be used. Systems employing organic positive electrodes and acidic electrolytes may also be used including rechargeable systems.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A planar battery which comprises, in combination, a container retaining, in superposed relationship, electrical energy generating components including:
   a. a planar anode;
   b. a planar cathode superposed substantially coextensive the anode;
   c. a planar separator positioned intermediate and extending substantially coextensive the facing surfaces of the anode and the cathode including marginal portions and an aqueous electrolyte permeable central portion;
   d. an aqueous electrolyte disposed in the central portion of the separator and in contact with the facing surfaces of the anode and the cathode; and
   e. an electrically nonconducting, vapor-impervious hydrophobic and thermoplastic sealant extending coextensive the marginal surfaces of the energy generating components and securing the energy generating components to at least one wall of the container.

2. A planar battery as defined in claim 1 wherein the sealant is a thermoplastic wax.

3. A planar battery as defined in claim 2 wherein the thermoplastic wax melts at a temperature within the range of about 140° F. to 200° F.

4. A planar battery as defined in claim 1 wherein the planar separator includes an electrolyte permeable central portion surrounded by sealant permeable marginal portions, and the electrolyte is disposed in the central portion of the separator, the sealant is disposed in the marginal portions of the separator and both the electrolyte and sealant are in contact with contiguous facing surfaces of the anode and the cathode.

5. A planar battery as defined in claim 4 wherein the anode comprises zinc.

6. A planar battery as defined in claim 5 wherein the zinc is secured to the surface of a conductive polymeric sheet positioned facing the separator.

7. A planar battery as defined in claim 6 wherein a conductive metallic sheet is secured to the surface of the exterior conductive polymeric sheet opposite the zinc.

8. A planar battery as defined in claim 7 wherein the conductive metallic sheet comprises lead.

9. A planar battery as defined in claim 5 wherein the cathode comprises carbon.

10. A planar battery as defined in claim 9 wherein the cathode includes maganese dioxide.

11. A planar battery as defined in claim 10 wherein the carbon and maganese dioxide are disposed in an electrically conductive ionically permeable polymeric matrix.

12. A planar battery as defined in claim 11 wherein the carbon/maganese dioxide mixture is secured to the surface of a conductive carbon retaining polymeric sheet positioned facing the separator.

13. A planar battery as defined in claim 12 wherein a conductive metallic sheet is secured to the surface of the exterior conductive carbon retaining sheet opposite the carbon/maganese mixture.

14. A planar battery as defined in claim 9 wherein the electrolyte comprises zinc chloride and/or ammonium chloride.

15. A planar battery as defined in claim 14 wherein the electrolyte is disposed in an ionically permeable polymeric matrix.

16. A planar battery as defined in claim 15 wherein the separator comprises electrolyte permeable fibrous sheet.

17. A planar battery as defined in claim 1 wherein the marginal portions of the separator comprise electrolyte permeable separator sheet impregnated with an electrolyte impermeable, sealant compatible thermoplastic polymer in a concentration effective to prevent electrolyte permeation of the marginal portions of the separator sheet.

18. A planar battery as defined in claim 17 wherein the thermoplastic polymer is a polymeric hot melt adhesive.

19. A planar battery as defined in claim 18 wherein the polymeric hot melt adhesive is a thermoplastic vinyl adhesive.

20. A planar battery as defined in claim 18 wherein one surface of the thermoplastic polymer impregnated marginal portions of the separator is secured by the sealant to the superposed facing surface of the anode and the other surface of the impregnated marginal portions of the separator is secured by the sealant to the superposed facing surface of the cathode.

21. A planar battery comprising a plurality of cells as defined in claim 1 in stacked and series relationship, each cell comprising, in combination:
   a. a planar anode;
   b. a planar cathode superposed substantially coextensive the anode;
   c. a planar separator including marginal portions and an aqueous electrolyte permeable central portion positioned intermediate and extending substantially coextensive the facing surfaces of the anode and the cathode;
   d. aqueous electrolyte disposed in the central portion of the separator and in contact with the facing surfaces of the anode and the cathode;
   e. an electrolyte impermeable electrically conducting intercell connector positioned intermediate and in coextensive contact with the facing surfaces of each superposed cell; and
   f. an electrically nonconducting vapor-impermeable wax sealant extending coextensive the marginal surfaces of the multicell battery normal to the stack of cells and intermediate the marginal portions of the separators and each next adjacent facing surface.

22. A planar battery as defined in claim 21 wherein the intercell connector comprises an electrolyte impermeable electrically conducting polymeric sheet material.

23. A planar battery as defined in claim 22 wherein the anode of the first of two superposed cells is adhesively secured to one surface of the intercell connector and the cathode of the second of the superposed cells is adhesively secured to the opposite surface of the connector.

24. A battery assemblage as defined in claim 1 wherein the container is adapted for enclosing a plurality of film units arranged in stacked relationship and including a forward wall having a light-transmitting section to permit exposure of the forwardmost film unit and a withdrawal opening in one wall of the container permitting selective withdrawal of the film units following exposure thereof and the battery is secured by the sealant to at least one wall of the container rearward of the film units.

25. A battery assemblage as defined in claim 24 including spring means biasing the film units towards the forward wall and the battery toward the rear wall.

26. A battery assemblage as defined in claim 24 including at least one opening in a wall of the container to permit conductor contact with each of the anode and the cathode.

27. A battery assemblage as defined in claim 25 including first and second openings in the rear wall, the first opening to permit conductor contact with the anode or cathode next adjacent the rear wall and the second opening to permit conductor contact with a conductor disposed in the container in contact with the electrode distal the rear wall.

28. A process for the manufacture of a planar battery which comprises, in combination, the steps of:
   a. positioning in stacked relationship within a container:
      1. a planar anode;
      2. a planar cathode superposed substantially coextensive the anode;
      3. a planar separator positioned intermediate and extending substantially coextensive the facing surfaces of the anode and the cathode and including marginal portions and an aqueous electrolyte permeable central portion; and
      4. an aqueous electrolyte disposed in the central portion of the separator and in contact with the facing surface of the anode and the cathode;
   b. contacting at least one wall of the container and the marginal portions of the stack with an electrically nonconducting, vapor-impervious, hydrophobic and thermoplastic sealant in fluid condition for a time sufficient to imbibe the sealant intermediate the marginal portions of the separator and the facing surface next adjacent thereto; and
   c. solidifying the sealant substantially coextensive the marginal surfaces of the stack and intermediate the marginal portions of the separator and the facing surface next adjacent, and thereby securing the stack to at least one wall of the container.

29. A process for the manufacture of a planar battery as defined in claim 28 wherein the thermoplastic sealant is wax.

30. A process for the manufacture of a planar battery as defined in claim 29 wherein the thermoplastic wax melts at a temperature within the range of about 140° F. to 200° F. to provide the fluid sealant and the sealant is solidified by reduction of the battery stack to a temperature less than the temperature at which the sealant melts.

31. A process for the manufacture of a planar battery as defined in claim 28 wherein the marginal portions of the separator comprise a fibrous material and the sealant is imbibed into the marginal portions.

32. A process for the manufacture of a planar battery as defined in claim 28 wherein the marginal portions of the separator are impregnated with an electrolyte impermeable, sealant compatible thermoplastic polymer in a concentration effective to prevent electrolyte permeation of the marginal portions of the separator.

33. A process for the manufacture of a planar battery as defined in claim 32 wherein the thermoplastic polymer is a polymeric hot melt adhesive.

34. A process for the manufacture of a planar battery as defined in claim 33 wherein the hot melt adhesive is fluid at a temperature at which the sealant is fluid and solid at the temperature at which the sealant is solid and including the step of melting the adhesive to the fluid state during contact of the battery stack with the fluid sealant.

35. A process for the manufacture of a planar battery as defined in claim 28 wherein one surface of the marginal portions of the separator are secured, upon sealant solidification, by the sealant to the superposed facing surface of the anode and the other surfaces of the marginal portions are secured by the sealant upon solidification to the superposed facing surfaces of the cathode.

36. A process for the manufacture of a planar battery as defined in claim 27 wherein the sealant is introduced into the container in a fluid state subsequent to insertion of the battery stack in the container.

37. A process for the manufacture of a planar battery as defined in claim 27 wherein the sealant is introduced into the container in a solid state and rendered fluid therein.

38. A process for the manufacture of a planar battery as defined in claim 27 wherein the marginal portions of the separator include spacer elements displacing marginal portions from continuous contact with the superposed facing surface of the anode and of the cathode.

* * * * *